Figure 4:
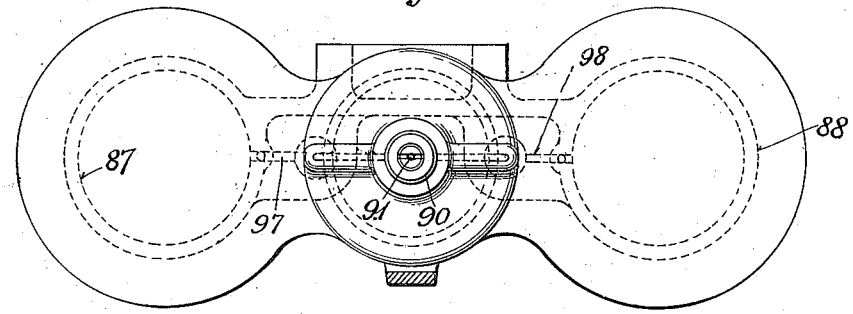

A. F. ROCKWELL.
STEERING DEVICE.
APPLICATION FILED MAY 3, 1906.
962,257.
Patented June 21, 1910.
3 SHEETS—SHEET 1.
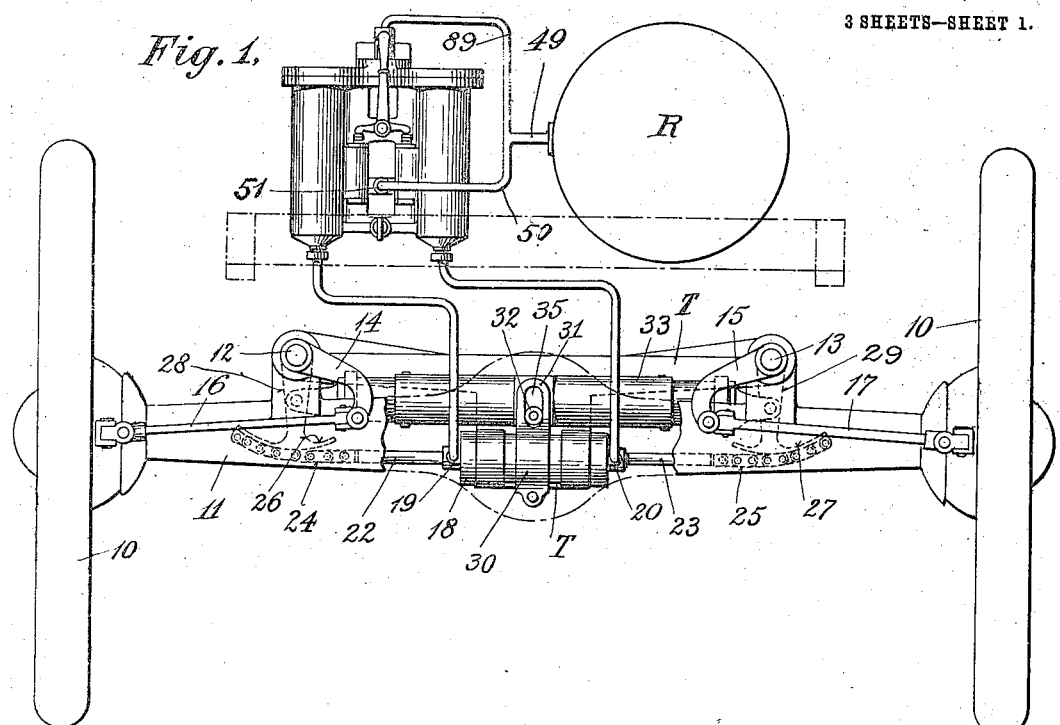
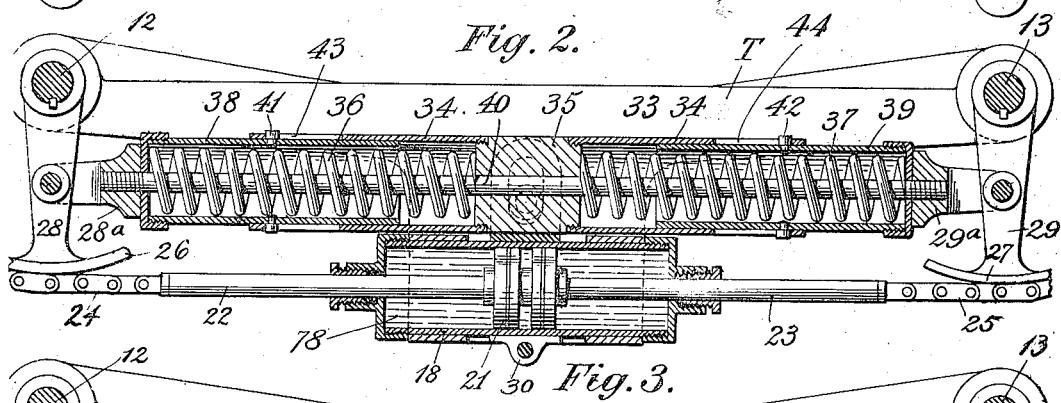
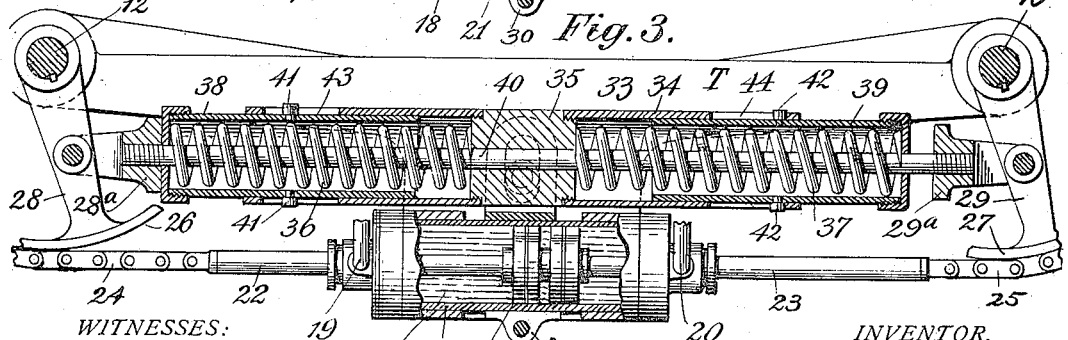
WITNESSES:
Chas. F. Schmelz
B. F. Funk
INVENTOR.
A. F. Rockwell,
BY Gales P. Moore
his ATTORNEY.

A. F. ROCKWELL.
STEERING DEVICE.
APPLICATION FILED MAY 3, 1906.

962,257.

Patented June 21, 1910.
3 SHEETS—SHEET 2.

WITNESSES:
Chas. F. Schmelz
B. F. Funk

INVENTOR.
A. F. Rockwell,
BY
Giles P. Moore
his ATTORNEY.

A. F. ROCKWELL.
STEERING DEVICE.
APPLICATION FILED MAY 3, 1906.

962,257.

Patented June 21, 1910.
3 SHEETS—SHEET 3.

WITNESSES:
Chas. F. Schmelz
B. F. Funk

INVENTOR.
A. F. Rockwell,
BY Giles P. Moore
his ATTORNEY.

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

STEERING DEVICE.

962,257.      Specification of Letters Patent.    Patented June 21, 1910.

Application filed May 3, 1906. Serial No. 315,079.

*To all whom it may concern:*

Be it known that I, ALBERT F. ROCKWELL, a citizen of the United States, residing at Bristol, county of Hartford, State of Connecticut, have invented a certain new and useful Steering Device, of which the following is a full, clear, and exact description, such as will enable others skilled in the art to which it appertains to make and use the same, reference being had to the accompanying drawings, forming part of this specification.

This invention relates to a fluid actuated steering gear for vehicles.

One of the objects of the invention is to provide means whereby the steering wheel or wheels of a vehicle may be under absolute control of an operator, so that the parts may be actuated by pressure governed by suitable controlling mechanism whereby the necessity for the hand wheel and its complementary gearing now generally used on certain classes of vehicles (as for example motor vehicles) may be dispensed with.

Another object of the invention is to provide means whereby the steering wheel or wheels may be set in proper positions for steering the vehicle in a straight course or in an arc and maintained in such positions without the liability of having such positions destroyed accidentally. In other words, one of the purposes of my invention is to provide means whereby I may set the steering wheels in their proper positions and have them held in such positions without the necessity of constant attention on account of backlash, or from other causes due to looseness of parts, etc.

Another object of my invention is to provide means for restoring the steering wheel or wheels to their normal position as soon as pressure is relieved against the actuating member with which the steering wheel or wheels contact.

Other objects and advantages, as well as the novel details of construction of this invention will be specifically set forth hereinafter, it being understood that changes in form, proportion and minor details of construction may be resorted to without departing from the spirit of the invention or sacrificing any of the advantages thereof.

Figure 5:
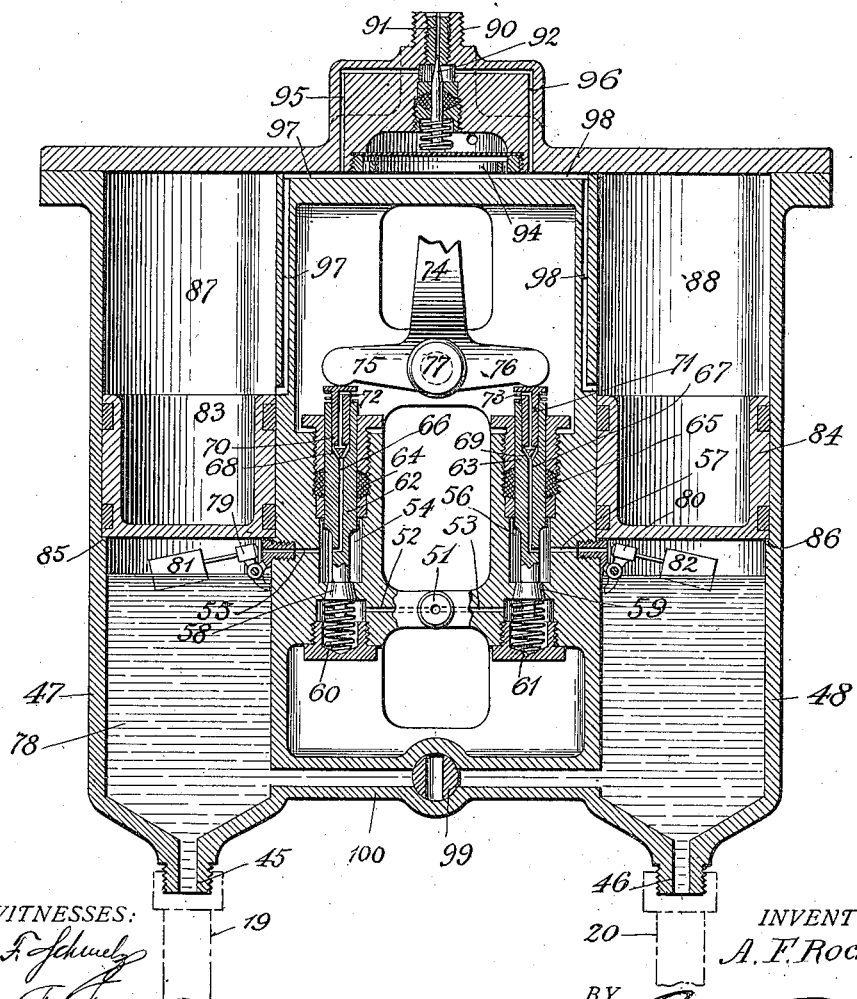

In the drawings: Figure 1 is an elevational view of a vehicle to which my invention is applied; Fig. 2 is a longitudinal sectional view through the steering mechanism, parts being shown in elevation; Fig. 3 is a similar view through the steering mechanism, the piston having pressure applied thereto; Fig. 4 is a plan view of the controller; Fig. 5 is a vertical, longitudinal, sectional view through the controller, parts being shown in their normal positions; and Fig. 6 is a similar view through the controller, the parts being shown in position to permit pressure to be exerted against an unelastic fluid on one side thereof.

In order to convey a proper conception of the method of utilizing my invention, I have illustrated in detail a preferred form applied to a vehicle, which may include the wheels 10, having axle connections, supported by the axle trees 11, which support the rockable elements 12 and 13 having arms 14 and 15 connected to parts of the wheels 10 by the links 16 and 17. In order to move the rockable elements 12 and 13 in unison, I provide appropriate actuating mechanism. The form illustrated in the drawings comprises the cylinder 18 carried by the running gear, as for example, the tie-bar T, between the axles, and this cylinder is shown as provided at its respective ends with ports communicating with the pipes 19 and 20, so that said pipes may supply fluid to the cylinder 18, or permit it to exhaust therefrom, according to the direction of movement of the piston 21, which is movable longitudinally within the said cylinder. Projecting from opposite ends of the piston 21 are stems 22 and 23 having flexible connections 24 and 25 with the arcuate portions 26 and 27 of the depending arms 28 and 29 rigid on the rockable elements 12 and 13. These arms 28 and 29 are connected by a tie-rod 40 and it will, therefore, follow that if pressure is admitted against one end of the piston 21, one of the arms 28 or 29 will be pulled out of its normal position by said piston 21 and its connections, and because the tie-rod 40 connects said arms 28 and 29, both arms must move in unison and each will move a distance equal to the other. The clip or support 30 carried by the cylinder 18 is provided with slotted projections 31 in which are the longitudinally movable trunnions 32 of an equalizing device 33. This equalizing device is illustrated as comprising a tube 34 having intermediate its ends an abutment 35 against which the inner ends of the respective springs 36 and 37 may abut. The opposite ends of these springs abut against the ends of the longitudinally sliding members, shown as tubes 38 and 39 respectively, and through the ends of which the tie-rod 40 projects. The tie-rod 40 is freely movable through the abutment 35 and through the ends of the tubes 38 and 39, and it is connected to the arms 28 and 29 by clevises 28ª and 29ª. The tubes 38 and 39 are provided with guide projections 41 and 42 respectively, which are longitudinally movable in the slots 43 and 44 of the tube 34. These guide projections serve the purpose of limiting the expansive movements of the springs 36 and 37. A good illustration of this is shown in Fig. 3, and by examination of this figure, it will be seen that the springs will be effective in restoring the arms 28 and 29 to their former positions as soon as pressure is relieved upon the piston 21. By reference to Figs. 2 and 3, it will be observed that the abutment 35 is held against longitudinal movement by its support comprising the clip or support 30 and the projections 31, but said member 35 is permitted to have a vertical play in said slots when the arms 28 and 29 are having movement imparted thereto by the piston 21. It will be observed, also, that the natural tendency of the springs 36 and 37 will be to maintain the arms 28 and 29 in their normal positions, as shown in Fig. 2, and as these arms 28 and 29 are connected to the rockable elements 12 and 13 which support the steering arms 14 and 15, it follows that when pressure is not exerted against the piston 21, the wheels will be held in positions to cause the vehicle to move in a straight path.

Figure 6:
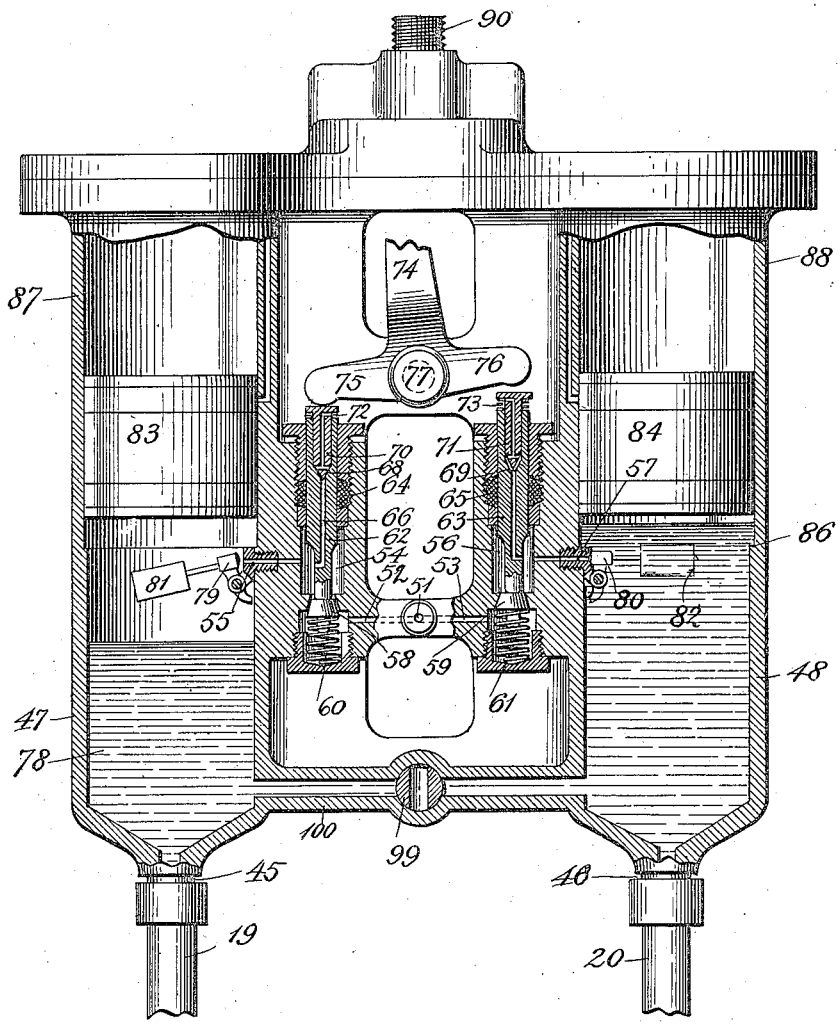

I have provided a controller for governing the movement of the piston 21 in its cylinder and for controlling the pressure applied to said piston, and a form of controller which may be readily connected to said cylinder is illustrated in Figs. 4, 5 and 6. The mechanism of which this controller consists is such that I am enabled to take advantage of pressure of an elastic fluid for giving an impulse or movement to the piston, and also employ a nonelastic or noncompressible fluid for maintaining the piston in the position to which it is moved, so that it may be temporarily held in such position during the time when the vehicle is scribing an arc. In order to provide means whereby the piston may receive an actuating impulse upon either face, I have provided the controller with two compartments or pressure cylinders, one for each face of the piston, and these compartments or cylinders are in communication with the cylinder 18 through the medium of the pipes or conduits 19 or 20, which are also connected to the ports 45 and 46, respectively, of the pressure cylinders 47 and 48 of the controller.

In order to simplify the construction, I preferably provide a single source of supply, such as a fluid under compression, which may be stored in a reservoir or tank R, which reservoir is provided with an outlet port 49 having a branch 50 at all times in communication with a supply port 51 of the controller, and this port 51 is provided with branches 52 and 53 adapted to admit the elastic fluid under pressure either through the chamber 54, through the port 55 into the cylinder 47, or through the chamber 56 through the port 57 into the cylinder 48. Pressure is normally prevented from entering either of these chambers, however, by either the spring pressed valve 58 in the chamber 54, or a similar valve 59 in the chamber 56, these valves 58 and 59 being maintained seated by the springs 60 and 61. The valves 58 and 59 are provided with stems 62 and 63, respectively, which project through the stuffing boxes 64 and 65 in the ends of the respective chambers 54 and 56. These stems are separate from the valves 58 and 59, but bear against them when depressed with sufficient force to unseat said valves. Each stem is provided with a longitudinal port, here designated by the numerals 66 and 67 respectively. These ports are provided with enlargements at their outlet ends to accommodate the valve seats 68 and 69, one in each stem. In the outlet ends of the ports 66 and 67 are longitudinally movable valves 70 and 71, which when seated cut off communication between the chambers 54 and 56 and the outside atmosphere, but which when unseated permit communication to be had between said chambers and said outside atmosphere. These valves are normally unseated by the springs 72 and 73 respectively, but either valve 70 or 71 may be seated by actuating the lever 74 to cause either the arm 75 to contact with the valve 70 or the arm 76 to contact with the valve 71. This lever is pivoted to a support, as at 77, so that movement to cause one of the valves to become seated, as for example, the valve 70, in Fig. 6, will be ineffective to seat the other valve, as for example, the valve 71, in Fig. 6. Therefore, the valves 58 and 70 may be actuated together, that is, one closed and the other subsequently opened, and the valves 59 and 71 may be actuated together to permit one to be opened after the other is closed, but one pair of valves will be operated independently of the other pair. It will, therefore, be clear that if the lever 74 is operated so as to seat the valve 70, and further operated to cause the arm 75 to be depressed to impart a longitudinal movement to the valve stem 62, (see Fig. 6), the valve 58 will be unseated and pressure will be admitted through the port 55 against the nonelastic or noncompressible fluid 78 in the cylinder 47. This fluid 78 will be forced through the pipe 19 into the cylinder 18 and against (as illustrated) the left hand end of the piston 21 to impart a longitudinal movement thereto, and thereby rock both arms 28 and 29 causing the rockable elements 12 and 13 to rock so that motion will be imparted to the arms 14 and 15 to swing the wheels on a vertical axis, (it being understood that these wheels may be fastened on the vehicle in any well known manner), and inasmuch as noncompressible fluid will be in the cylinder 18 on either end of the piston 21, the liability of a free longitudinal play of the piston will be reduced to a minimum if not wholly eliminated, so that practically the wheels will be held at the proper angle because the fluid within the cylinder 18 cannot be compressed. In order to make the controller effective, I have provided a nonelastic fluid in both cylinders 47 and 48, it being understood that the operation just described will result by depressing the valve stem 63, in which event the pressure would be admitted into the cylinder 48 and permitted to exhaust from the cylinder 47, because when one of the valves 70 or 71 is depressed, the other must necessarily be unseated, and whenever one of the valves is unseated the elastic pressure in its coöperating cylinder is permitted to exhaust. However, I have provided means for preventing the exhausting of the nonelastic fluid from either of the cylinders, and the means illustrated in the drawings consist of the valves 79 and 80 in the cylinders 47 and 48. These valves are provided with floats 81 and 82, so that if the level of the nonelastic fluid in either cylinder approaches closely to the ports 55 or 57, the float in the particular cylinder in which the fluid is rising will seat this valve and close its particular port, so that the level may rise above either port without passing therethrough. An illustration of this is shown in Fig. 6.

In order to provide for an effective operation of the actuating piston 21 without the expenditure of a large volume of elastic fluid under compression, and to further take care of the exhausting nonelastic fluid, I have provided what might properly be termed extensible cylinders or chambers, in that the effective capacity of the cylinders may be varied to suit varying conditions. In other words, the effective capacity of each cylinder may increase or diminish according to whether the nonelastic fluid is exhausting into that particular cylinder or whether it is under compression. In order to provide for the extensibility of the cylinders, I may include in each cylinder a piston, in the present instance these pistons being designated by the numerals 83 and 84, and these pistons may normally be seated upon the seats 85 and 86 in their respective cylinders. It is desirable to provide means for resisting the upward movement of these pistons, and a convenient way of doing this is to admit pressure in rear of the pistons. This can conveniently be done by connecting the cushion chambers 87 and 88 with the reservoir R, which may supply pressure thereto. In the form illustrated in the drawings a branch conduit 89 is in communication with the port 49 of the reservoir R, and is connected to a nipple 90 carried by the casing of the controller. This nipple is provided with a port 91 normally closed by the needle valve 92 which is actuated by a diaphragm within a chamber 94 in the casing. This chamber is provided with ports 95 and 96 adapted to communicate with the port 91 in the nipple 90, and the chamber also communicates with the cushion chambers 87 and 88 through the ports 97 and 98 which have their outlets in rear of the pistons, when said pistons are seated. By reference to Fig. 5, it will be seen that a predetermined pressure may be automatically maintained in the chambers 87 and 88, because when the pressure in either cylinder falls below the pressure for which the valve 92 has been set, the diaphragm will permit the valve to be unseated and additional pressure will be admitted into the chambers 87 and 88, or at least into the chamber in which the piston is seated, and as soon as the predetermined pressure is restored, the valve 92 will again be seated by its diaphragm, and communication between the ports 95 and 96 and the reservoir will be cut off. The pressure in either or both of these chambers 87 and 88 will have a tendency to resist any movement of either of the pistons, so that when pressure is admitted over the nonelastic fluid in either cylinder 47 or 48, the normal tendency of the fluid to pass through the pipes 19 will permit the fluid to be forced out of one of the cylinders, so as to actuate the piston 21. The movement of the piston 21 in one direction will force the nonelastic fluid from one end of the cylinder 18 into the cylinder 47 or 48 (into the one with which it communicates) and a continued movement of the piston 21 will be effective in first permitting the elastic fluid to exhaust, and a continued rise of the fluid in the exhausting cylinder will close one of the valves lifted with a float, and a further continued movement will permit the piston in the exhausting chamber to rise and cut off communication with its pressure supply port and provide room for displacing the nonelastic fluid. As soon as the lever 74 is actuated, so as to permit the pressure to be relieved, the pressure back of the piston which has been raised will have a tendency to restore the nonelastic fluid to the cylinder 18 and move the piston 21 to its normal position. This may be augmented by the equalizing mechanism illustrated in Figs. 2 and 3.

It is desirable to maintain an equal level of the nonelastic fluid in both cylinders 47 and 48 under normal conditions, and if from any cause the levels of the fluid in the cylinders 47 and 48, under normal conditions become unequal, the equality of the levels may be restored by actuating the ported turning plug 99 in the transverse port 100, which communicates with the rear portions of the respective cylinders 47 and 48.

For ordinary purposes, that is, to swerve slightly from side to side, or in scribing a wide arc the pistons in the cylinders 47 and 48 will not be moved because pressure from the reservoir may be introduced into one of said cylinders to exert sufficient pressure upon the piston 21 and the piston 21 may be held in the proper position to maintain the desired angle of deflection of the wheels, simply by causing the lever 74 to assume such a position that the exhaust valves 70 or 71, as the case may be, will remain seated. As soon, however, as the seated exhaust valve is released the wheels will be returned to their normal positions to cause the vehicle to travel in a straight path. When it is desired to effect a sharp turn, as for example, in turning a corner, the quantity of non-compressible fluid which must exhaust from one end of the cylinder 18 may be cared for by enlarging the receiving space in either the cylinder 47 or 48 by permitting the piston or pistons to have longitudinal movement and thereby minimize the volume of elastic fluid necessary to perform the function for which it is intended.

What I claim is:

1. A motor for steering mechanism, comprising a receptacle having fluid pressure supply and exhaust ports, valves in the respective ports and arranged for coöperative movement, means for unseating one valve when the other is seated, and a stem on one of the valves for supporting the other valve.

2. In a motor for steering mechanism, the combination with an extensible cylinder or receptacle, of means for resisting the extensibility of the cylinder, said means comprising provision for permitting the extensibility of the cylinder, a steering element, a casing about the same and means for effecting communication between the casing and the cylinder.

3. In a steering mechanism, a motor comprising an extensible cylinder having an outlet port and an inlet port, means for normally preventing the extensibility of the cylinder, said means comprising provision for automatically permitting the extensibility of the cylinder under a predetermined pressure.

4. In a motor for steering mechanism, the combination with a pair of cylinders arranged side by side and in communication with each other, of longitudinally movable floating pistons therein, inlet ports for said cylinders to admit pressure thereinto in front of said piston, and means in rear of the piston for permitting a resisting force to be exerted against each of said pistons.

5. A motor for steering mechanism, comprising a receptacle having a non-elastic fluid therein, means for permitting the extensibility of the capacity of said receptacle, and an elastic fluid supply port communicating with said receptacle.

6. In a motor, the combination with a pair of cylinders having longitudinally movable pistons therein, inlet ports for said cylinders in front of the piston to admit pressure against said pistons, and means in rear of the pistons for maintaining a predetermined resisting force.

7. The combination with a cylinder, having a liquid therein and an elastic fluid pressure port in communication with the interior thereof, of a float valve controlling said port, and a movable steering element having a casing in communication with said cylinder, the movement of said steering element being effected by varying the level of the liquid in said cylinder.

8. A motor for steering mechanisms, comprising a cylinder, a valve casing in communication with said cylinder, a spring pressed reciprocatory valve stem in said casing, an inlet valve on said valve stem, an exhaust opening in said stem, and a spring actuated valve in said exhaust opening.

9. A motor for steering mechanisms comprising communicating cylinders having longitudinally operating pistons therein, means for admitting pressure in rear of said pistons, and pressure admitting valves in communication with said cylinders in front of said pistons.

In testimony whereof, I hereunto affix my signature, in the presence of two witnesses.

ALBERT F. ROCKWELL.

Witnesses:
JOSEPH D. BROWN,
CLARA H. VOORHEES.